United States Patent [19]

Malinowski et al.

[11] Patent Number: 4,727,006
[45] Date of Patent: Feb. 23, 1988

[54] METHOD OF MONITORING ELECTROCHEMICAL CELLS

[75] Inventors: Gregory J. Malinowski, Oakhurst, N.J.; Deborah M. Chaskin, Flushing, N.Y.

[73] Assignee: The United States of America as represented by the Secretary of the Army, Washington, D.C.

[21] Appl. No.: 831,027

[22] Filed: Feb. 12, 1986

[51] Int. Cl.[4] ................. H01M 10/44; H01M 10/48; H02J 7/04
[52] U.S. Cl. .......................... 429/50; 429/61; 429/62; 429/90; 320/35; 320/36; 73/52
[58] Field of Search .............. 429/50, 61, 62, 90; 320/35, 36; 436/147; 73/52

[56] References Cited

U.S. PATENT DOCUMENTS

| | | | |
|---|---|---|---|
| 1,497,388 | 6/1924 | Sterling | 429/50 |
| 3,771,351 | 11/1973 | Sacks et al. | 73/52 |
| 3,855,003 | 12/1974 | Bush | 429/90 |
| 3,895,283 | 7/1975 | Peterson | 320/36 X |
| 4,142,027 | 2/1979 | Tsygankov et al. | 429/223 X |

FOREIGN PATENT DOCUMENTS

| | | | |
|---|---|---|---|
| 58-059568 | 4/1983 | Japan | 429/92 |
| 58-157066 | 9/1983 | Japan | 429/92 |
| 58-214282 | 12/1983 | Japan | 429/90 |
| 515193 | 6/1976 | U.S.S.R. | 429/62 |

Primary Examiner—Brian E. Hearn
Assistant Examiner—Stephen Kalafut
Attorney, Agent, or Firm—Sheldon Kanars; Jeremiah G. Murray; Roy E. Gordon

[57] ABSTRACT

The physical and electrical condition of electrochemical cells of a battery is monitored on a continuous basis so that corrective action can be taken before explosion and/or venting occurs by a method including the steps of:

(A) coating the electrically conductive shell of each cell of the battery with a thin non electrically conductive layer, (B) applying a sensor stripe over the non electrically conductive layer so that the sensor stripe does not make electrical contact to the shell of the cell, (C) connecting leads to the sensor and then coating the sensor with a protective layer, and (D) connecting the sensor leads of individual cells of the battery into an electrical series circuit, the remaining leads of the series sensor circuit being connected to an alarm/control network that monitors the conductivity of the series electrical path.

11 Claims, 4 Drawing Figures

METHOD OF MONITORING ELECTROCHEMICAL CELLS

The invention described herein may be manufactured, used, and licensed by or for the Government for governmental purposes without the payment to us of any royalty thereon.

The invention relates in general to a method of monitoring electrochemical cells and in particular to a method of monitoring on a continous basis the physical and electrical condition of electrochemical cells of a battery so that corrective action can be taken before explosion and/or venting occurs.

BACKGROUND OF THE INVENTION

Certain electrochemical cells, as for example, lithium cells, nickel cadmium cells, andmagnesium cells are desireable as power sources because of their high energy density. One of the difficulties encountered however in working with these cells in the field is that they are subject to overheating and excessive internal pressures caused by external electrical overstresses.

Heretofore, the art has not provided any type of sensor for monitoring, on a continuous basis, the physical condition and electrical condition of the cells of these batteries as they are used in the field to determine whether such a battery is overstressed.

SUMMARY OF THE INVENTION

The general object of this invention is to provide a simple method of monitoring on a continuous basis the physical and electrical condition of electrochemical cells of a battery as the battery is used in the field so that corrective action can be taken before explosion and/or venting occurs.

It has now been found that the aforementioned object can be attained by a method including the steps of:

(A) coating the electrically conductive shell of each cell of the battery with a thin non electrically conductive layer, (B) applying a sensor stripe over the non electrically conductive layer so that the sensor stripe does not make electrical contact to the shell of the cell, (C) connecting leads to the sensor and then coating the sensor with a protective layer, and (D) connecting the sensor leads of individual cells of the battery into an electrical series circuit, the remaining leads of the series sensor circuit being connected to an alarm/control network that monitors the conductivity of the series electrical path.

The purpose of the technique of method is to monitor on a continuous basis, the physical condition (pressure and temperature) and electrical condition (output voltage) of cells to determine whether a battery is overstressed. It can be used as the primary sensor to a warning system to provide an alarm and/or take actions to prevent venting or explosion. The method should be used with all batteries located where the cells might vent or explode and do physical harm to equipment and/or personnel.

The method is advantageous in that it provides a warning of impending failure of a battery and/or its cells, so that corrective action may be taken before exposion and/or venting occurs that would cause damage to any electronic equipment and possible injury to nearby personnel.

DESCRIPTION OF THE DRAWING

Referring to FIG. 1, the cell, 10 has a shell, 12 made from an electrically conductive material. It is coated with a non-conductive layer, 14 so that a sensor stripe, 16 placed on the non-conductive layer, 14 will not make electrical contact to the shell, 12 of the cell, 10. The insulating layer, 14 must be a poor conductor of electricity and a good thermal conductor. The thickness of layer 14 must be kept to a minimum. Examples of such materials may be a thin layer of epoxy or an anodized surface. The sensor stripe, 16 applied over layer 14 must be made of an electrically conductive material with a low elasticity coefficient, not very malleable and a melting point equal to that temperature at which the cell being monitored becomes critical. Examples of such materials may be an alloy composed of 12 and $\frac{1}{2}$ percent by weight of tin, 25 percent by weight of lead, 50 percent by weight of bismuth, and 12 and $\frac{1}{2}$ percent by weight of cadmium and having a melting point of 75°. C. or an alloy composed of 63 percent by weight of tin and 37 percent by weight of lead and having a melting point of 183° C. Layer, 14 and the sensor stripe, 16 may actually cover the venting device, 18 if there is a venting device at the side of the cell. If there is no venting device on the side of the cell, the method may still be applied since strain is still measured regardless of the location of the vent. To monitor the action of the sensor, leads, 20 are connected as shown.

Referring to FIG. 2, a protective layer, 22 is coated over the sensor stripe, 16. This protective layer is provided to protect the sensor stripe, 16 from damage and to provide a covering for the cell, 10. The layer, 22 is usually made from thermally shrunk polymer tubing.

Referring to FIG. 3, this shows how the sensor stripe, 16 can be composed of different sensors in the event that one material cannot meet both the pressure and temperature specifications required. The multiple sensor elements, denoted by the numbers 24 and 26 in FIG. 3, are connected together to form a continuous series electrical path. Bonding pads, 28 of a metallic material are used to interface the junctions of the conductive thermally sensitive materials, 24 to the conductive stress/strain sensitive materials, 26 and the sensor leads, 20. If the cells venting device, 18 is covered by a multiple sensor, that portion of the sensor sensitive to stress/strain, 26 should be above the vent. The conductive stress/strain material can be conveniently obtained using about 0.001 inch thick tin foil.

Referring to FIG. 4, the sensors of the cell form a conductive path between the sensor leads such that an electrical current can flow between the leads. If a battery contains multiple cells as shown in FIG. 4, the sensors of the individual cells are connected in series. This provides protection for all the cells in the battery. The weakest cell will cause the series path between the leads to open circuit. When a cell reaches a critical pressure the stress/strain sensitive sensors reach their ultimate strength and break. This causes the continuous electrical path between the sensor leads to open circuit. A continuous current can no longer flow between them. Likewise, a sensor could open circuit due to the melting of the thermally sensitive materials when the cell reaches its critical temperature. In addition to the sensors already discussed, it is also important to monitor the cells output voltage (EMF) on a continuous basis. This provides additional information on the internal condition of the cell. A significant lowering of the cells output voltage from its nominal output voltage is a warning of either the cells 'end of life' or overstress due to some external condition.

FIG. 4 represents how the sensors can be applied in a system. The sensor leads of individual cells of a battery are connected in an electrical series circuit. The remaining leads of the series sensor circuit are connected to an alarm/control network. The alarm/control network receives its power (designed to be small compared to the system load) from the battery being tested. Since the alarm/control network is connected to the output of the battery it can also monitor the output voltage of the battery. Note that the sensor that is monitoring the battery is not in the main path of the current that powers the system being operated by the battery. The alarm/control network monitors a small current it places thru the sensor leads. An interruption of this current caused by the open circuiting of any of the sensors causes the alarm/control network to signal an alarm and/or provides a control signal to disconnect the system from the battery. The removal of the system being powered by the battery will thereby prevent further overstress of the battery and prevent the battery from exploding or venting. In addition, the network can be activated by a low voltage condition of the battery output.

Figure 1:
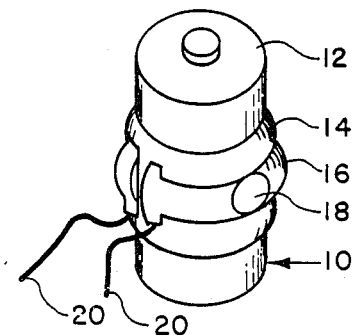
FIG. 1 illustrates a typical battery cell as it is processed according to the method of the invention.
Figure 2:
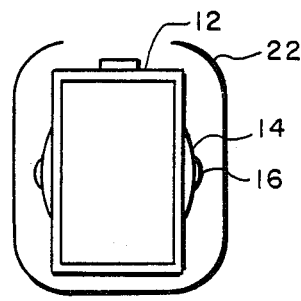
FIG. 2 is a cut away view of the cell of FIG. 1.
Figure 3:
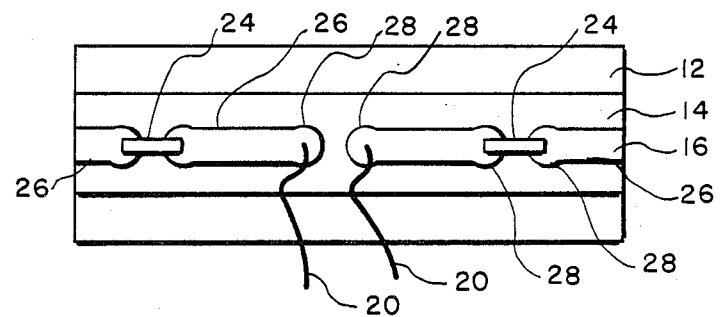
FIG. 3 illustrates a flattened out view of the sensor.
Figure 4:
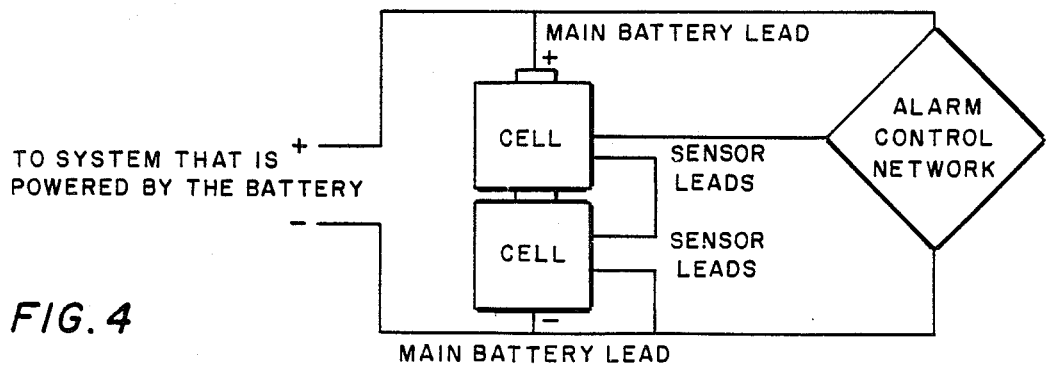
FIG. 4 illustrates how the sensors are applied in a system.

We wish it to be understood that we do not desire to be limited to the exact details as described for obvious modifications will occur to a person skilled in the art.

What is claimed is:

1. Method of monitoring on a continuous basis the physical and electrical condition of electrochemical cells of a battery so that corrective action can be taken before explosion and/or venting occurs, and wherein each of the electrochemical cells has an electrically conductive shell, said method including the steps of:
    (A) coating the electrically conductive shell of each cell of the battery with a thin non electrically conductive layer,
    (B) applying a sensor stripe over the non electrically conductive layer so that the sensor does not make electrical contact to the shell of the cell, wherein the sensor stripe is comprised of multiple sensor elements including a conductive thermally sensitive material and a conductive stress/strain material, and wherein said materials are connected together to form a continuous series electrical path using bonding pads of a metallic material to interface the junctions of the conductive thermally sensitive material and the sensor leads.
    (C) connectng leads to the sensor and then coating the sensor with a protective layer, and
    (D) connecting the sensor leads of individual cells of the battery into an electrical series circuit, the remaining leads of the series sensor circuit being connected to an alarm/control network that monitors the conductivity of the series electrical path.

2. Method according to claim 1 wherein the thin non-electrically conductive layer is a good thermal conductor and has a low elasticity coefficient.

3. Method according to claim 2 wherein the thin non-electrically conductive layer is selected from the group consisting of a thin layer of epoxy and an anodized surface.

4. Method according to claim 3 wherein the thin non-electrically conductive layer is a thin layer of epoxy.

5. Method according to claim 3 wherein the thin non-electrically conductive layer is an anodized surface.

6. Method according to claim 1 wherein the sensor stripe is comprised of an electrically conductive material having a low elasticity coefficient, that is not very malleable, and that has a melting point equal to that temperature at which the cell being monitored becomes critical.

7. Method according to claim 6 wherein the sensor stripe is comprised of an alloy of $12\frac{1}{2}$ percent by weight of tin, 25 percent by weight of lead, 50 percent by weight of bismuth, and $12\frac{1}{2}$ percent by weight of cadmium and having a melting point of 75° C.

8. Method according to claim 6 wherein the sensor stripe is composed of an alloy of 63 percent by weight of tin and 37 percent by weight of lead and having a melting point of 183° C.

9. Method according to claim 1 wherein the non-electrically conductive layer and the sensor stripe cover the venting device of the cell.

10. Method according to claim 1 wherein the non-electrically conductive layer and the sensor stripe do not cover the venting device of the cell.

11. Method according to claim 1 wherein the protective layer is comprised of thermally shrunk polymer tubing.

* * * * *